US009167309B2

(12) United States Patent
Lee et al.

(10) Patent No.: US 9,167,309 B2
(45) Date of Patent: Oct. 20, 2015

(54) METHOD AND SYSTEM FOR TRANSMITTING BROADCAST AND DATA STREAM AND METHOD AND APPARATUS FOR CONVERTING BROADCAST AND DATA STREAM IN HFC-BASED CABLE NETWORK

(71) Applicant: Electronics and Telecommunications Research Institute, Daejeon (KR)

(72) Inventors: Ho Sook Lee, Daejeon (KR); Dong Joon Choi, Daejeon (KR); Nam Ho Hur, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 13/957,134

(22) Filed: Aug. 1, 2013

(65) Prior Publication Data
US 2014/0215530 A1    Jul. 31, 2014

(30) Foreign Application Priority Data

Jan. 31, 2013    (KR) .................. 10-2013-0011201

(51) Int. Cl.
| | | |
|---|---|---|
| H04N 7/16 | (2011.01) |
| H04N 7/173 | (2011.01) |
| H04N 21/61 | (2011.01) |
| H04L 12/28 | (2006.01) |
| H04N 21/239 | (2011.01) |
| H04N 21/238 | (2011.01) |

(52) U.S. Cl.
CPC ........ *H04N 21/6131* (2013.01); *H04L 12/2801* (2013.01); *H04N 21/238* (2013.01); *H04N 21/239* (2013.01); *H04N 21/6106* (2013.01); *H04N 21/6125* (2013.01)

(58) Field of Classification Search
CPC .. H04N 21/238; H04N 21/239; H04I 12/2801
USPC ...................................... 725/62, 111
See application file for complete search history.

(56) References Cited

U.S. PATENT DOCUMENTS

| | | | |
|---|---|---|---|
| 2003/0154497 A1* | 8/2003 | Masuda et al. ................ 725/129 |
| 2004/0184806 A1* | 9/2004 | Lee et al. ........................ 398/79 |
| 2004/0218606 A1* | 11/2004 | Leatherbury et al. ...... 370/395.5 |
| 2007/0109397 A1* | 5/2007 | Yuan et al. ................. 348/14.02 |

(Continued)

FOREIGN PATENT DOCUMENTS

| | | |
|---|---|---|
| KR | 10-2005-0081133 | 8/2005 |
| KR | 10-0861239 | 10/2008 |

*Primary Examiner* — Pankaj Kumar
*Assistant Examiner* — Franklin Andramuno
(74) *Attorney, Agent, or Firm* — Kile Park Reed & Houtteman PLLC

(57) ABSTRACT

A method for transmitting broadcast and data streams in an HFC-based cable network includes a first transmission step of a broadcast transmission apparatus sending broadcast and data service streams in an IP-based stream or RF signal form through an optical section up to a cell node that is a contact point between the optical section and a cable section of a cable network and a second transmission step of the cell node converting the broadcast and data service streams into one of RF signal, IP-based stream, and RF/IP convergence service stream forms depending on a service type of a subscriber terminal and sending the converted broadcast and data service streams to the subscriber terminal through the cable section.

16 Claims, 7 Drawing Sheets

(56) References Cited

U.S. PATENT DOCUMENTS

| | | |
|---|---|---|
| 2009/0235322 A1* | 9/2009 | Krein et al. .................. 725/127 |
| 2011/0078755 A1* | 3/2011 | Dai .............................. 725/111 |
| 2011/0153859 A1 | 6/2011 | Lee |
| 2011/0154424 A1 | 6/2011 | Lee |
| 2012/0124628 A1* | 5/2012 | Kim et al. ...................... 725/87 |

* cited by examiner

METHOD AND SYSTEM FOR TRANSMITTING BROADCAST AND DATA STREAM AND METHOD AND APPARATUS FOR CONVERTING BROADCAST AND DATA STREAM IN HFC-BASED CABLE NETWORK

Priority to Korean patent application number 10-2013-0011201 filed on Jan. 31, 2013, which is incorporated by reference in their entirety herein.

BACKGROUND OF THE INVENTION

1. Field of the Invention

The present invention relates to a transport platform and, more particularly, to a transport platform for efficiently transmitting various cable broadcast services.

2. Discussion of the Related Art

Existing wired broadcast service that provides multi-channel video services to a subscriber chiefly uses a Hybrid Fiber Coax (hereinafter referred to as 'HFC')-based cable network as a transmission medium. The HFC network transfers an MPEG-2 TS-based broadcast stream through a modulated Radio Frequency (RF) signal from a headend, that is, the transport service supply point of a service provider, to the subscriber device of a home, performs optical transmission through the analog up-conversion of the modulated RF signal from the headend to the service entry point of a subscriber service group, and transmits the RF signal through photoelectric conversion from an Optical Network Unit (ONU), that is, the end point of optical transmission, to a subscriber.

In RF-based transmission service using the above method, not only MPEG-2 TS-based broadcast service, but also IP-based data transmission is provided through an MPEG-2 TS container according to a Data over Cable Service Interface Specification (IDOCSIS) standard. To this end, an expensive Cable Modem Termination System (CMTS) is necessary for the headend, and frequency bands are also inefficiently used because some frequency bands other than frequency bands for broadcast are shared by a service group and used as frequency bands for data transmission.

Furthermore, with the recent development of high-speed Time Division Multiplexing (TDM) optical transmission technology, such as an Ethernet Passive Optical Network (EPON) of a 1 Gbps band, a cheap Optical Line Terminal (OLT) can be configured. Furthermore, a bandwidth that can accommodate an optical transmission section is rapidly increased owing to technology, such as a 10G Passive Optical Network (PON) or wavelength-division multiplexing, but a bottleneck phenomenon is inevitable in using the frequency band in a coaxial cable section because of the sharing of a broadcast frequency band and high costs for cable data transmission.

Accordingly, an HFC network is evolving into a combination of a PON and cable broadcast, such as RF over Glass (RFoG), a DOCSIS-PON, and EPON over Cable (EPoC), technology in which a coaxial section is brought closer to a subscriber in order to increase the quality of a cable transmission signal, and technology in which RF/IP convergence transmission is efficiently accommodated, such as a Converged Cable Access Platform (CCAP). In the recent rapid trend of smart service development, broadcast-data convergence type transmission accompanied by IP-based data is also necessary even in the broadcast service. Accordingly, it is necessary to construct a transport platform for an improved frequency band and efficient RF/IP convergence type transmission in a cable network.

SUMMARY OF THE INVENTION

The present invention provides a method and system for transmitting broadcast and data streams in an HFC-based cable network and a method and apparatus for converting broadcast and data streams in an HFC-based cable network, which can construct a transport platform for efficiently integrating and providing various cable broadcast services by placing a transmission system for RF/IP convergence video transmission in a cell node, that is, a contact point between an optical section and a coaxial section, in the HFC-based cable network.

In accordance with an aspect of the present invention, a method for transmitting broadcast and data streams in a Hybrid Fiber Coax (HFC)-based cable network includes a first transmission step of a broadcast transmission apparatus sending broadcast and data service streams in an IP-based stream or Radio Frequency (RF) signal form through an optical section up to a cell node that is a contact point between the optical section and the cable section of a cable network and a second transmission step of the cell node converting the broadcast and data service streams into one of RF signal, IP-based stream, and RF/IP convergence service stream forms depending on a service type of a subscriber terminal and sending the converted broadcast and data service streams to the subscriber terminal through the cable section.

The first transmission step may include a step of providing the broadcast service streams having the RF signal form in an overlay structure form through wavelength-division multiplexing so that a plurality of independent logical networks is constructed in one physical topology.

The second transmission step may include a step of separating frequency channel bands through a cable medium for each cell, allocating the separated frequency channel band to each cell, and sending the converted transport streams to terminals belonging to a subscriber group within the cell.

The second transmission step may include a step of allocating the cable frequency channel band to terminals belonging to subscriber groups included in different cells so that the terminals reuse an identical cable frequency channel band.

The second transmission step may include a step of identifying a broadcast service request from the subscriber terminal, selecting only real-time watching broadcast service streams from the broadcast and data service streams, and converting the selected real-time watching broadcast service streams.

The second transmission step may include a step of identifying a broadcast service request from a subscriber terminal within the cable section which belongs to a service group using an identical cable frequency band, selecting only real-time watching broadcast service streams from the broadcast and data service streams, and converting the selected real-time watching broadcast service streams.

The second transmission step may include a step of modulating the IP-based broadcast and data service streams into MPEG-2 TS-based RF signals and sending the MPEG-2 TS-based RF signals to the subscriber terminal or generating IP-based broadcast and data transport streams in the cable section irrespective of the protocol of an MAC/PHY transport layer based on the IP-based broadcast and data service streams and sending the IP-based broadcast and data transport streams to the subscriber terminal.

The second transmission step may include a step of performing photoelectric conversion on the broadcast service streams having the RF signal form and sending the photoelectric-converted broadcast service streams through the cable section or filtering only service streams, requested by the subscriber terminal, from the broadcast service streams having the RF signal form and sending the filtered service streams to the subscriber terminal. The second transmission step may include a step of generating IP-based broadcast and data transport streams in the cable section irrespective of the protocol of an MAC/PHY transport layer based on broadcast or Data Over Cable Service Interface Specification (DOCSIS)-based service streams having the RF signal form and sending the IP-based broadcast and data transport streams to the subscriber terminal.

In accordance with another aspect of the present invention, a system for providing broadcast service in an HFC-based cable network includes a broadcast transmission apparatus configured to send broadcast and data service streams in an IP-based stream or Radio Frequency (RF) signal form through an optical section up to a cell node that is a contact point between the optical section and the cable section of a cable network; the cell node configured to convert the broadcast and data service streams into one of RF signal, IP-based stream, and RF/IP convergence service stream forms depending on a service type of a subscriber terminal and send the converted broadcast and data service streams to the subscriber terminal through the cable section; and the subscriber terminal configured to receive the converted streams from the cell node.

The broadcast transmission apparatus may provide the broadcast service streams having the RF signal form in an overlay structure form through wavelength-division multiplexing so that a plurality of independent logical networks is constructed in one physical topology.

The cell node may separate frequency channel bands through a cable medium for each cell, allocate the separated frequency channel band to each cell, and send the converted transport streams to terminals belonging to a subscriber group within the cell.

The cell node may allocate the cable frequency channel band to terminals belonging to subscriber groups included in different cells so that the terminals reuse an identical cable frequency channel band.

The cell node may identify a broadcast service request from the subscriber terminal, select only real-time watching broadcast service streams from the broadcast and data service streams, and convert the selected real-time watching broadcast service streams.

The cell node may identify a broadcast service request from a subscriber terminal within the cable section which belongs to a service group using an identical cable frequency band, select only real-time watching broadcast service streams from the broadcast and data service streams, and convert the selected real-time watching broadcast service streams.

The cell node may modulate the IP-based broadcast and data service streams into MPEG-2 TS-based RF signals and send the MPEG-2 TS-based RF signals to the subscriber terminal or may generate IP-based broadcast and data transport streams in the cable section irrespective of the protocol of an MAC/PHY transport layer based on the IP-based broadcast and data service streams and send the IP-based broadcast and data transport streams to the subscriber terminal.

The cell node may perform photoelectric conversion on the broadcast service streams having the RF signal form and send the photoelectric-converted broadcast service streams through the cable section or may filter only service streams, requested by the subscriber terminal, from the broadcast service streams having the RF signal form and sending the filtered service streams to the subscriber terminal.

The cell node may generate IP-based broadcast and data transport streams in the cable section irrespective of the protocol of an MAC/PHY transport layer based on broadcast or Data Over Cable Service Interface Specification (DOCSIS)-based service streams having the RF signal form and send the IP-based broadcast and data transport streams to the subscriber terminal.

In accordance with yet another aspect of the present invention, a broadcast and data stream conversion method of a cell node located at a contact point between an optical section and a cable section in an HFC-based cable network includes receiving broadcast and data service streams having an IP-based stream or RF signal form from a broadcast transmission apparatus and converting the broadcast and data service streams into one of RF signal, IP-based stream, and RF/IP convergence service stream forms depending on a service type of a subscriber terminal and sending the converted broadcast and data service streams to the subscriber terminal through a cable section.

In accordance with further yet another aspect of the present invention, a broadcast and data stream conversion apparatus of a cell node located at a contact point between an optical section and a cable section in an HFC-based cable network includes a reception unit configured to receive broadcast and data service streams having an IP-based stream or RF signal form from a broadcast transmission apparatus and a transmission unit configured to convert the broadcast and data service streams into one of RF signal, IP-based stream, and RF/IP convergence service stream forms depending on a service type of a subscriber terminal and sending the converted broadcast and data service streams to the subscriber terminal through a cable section.

DETAILED DESCRIPTION OF THE EMBODIMENTS

Figure 1:
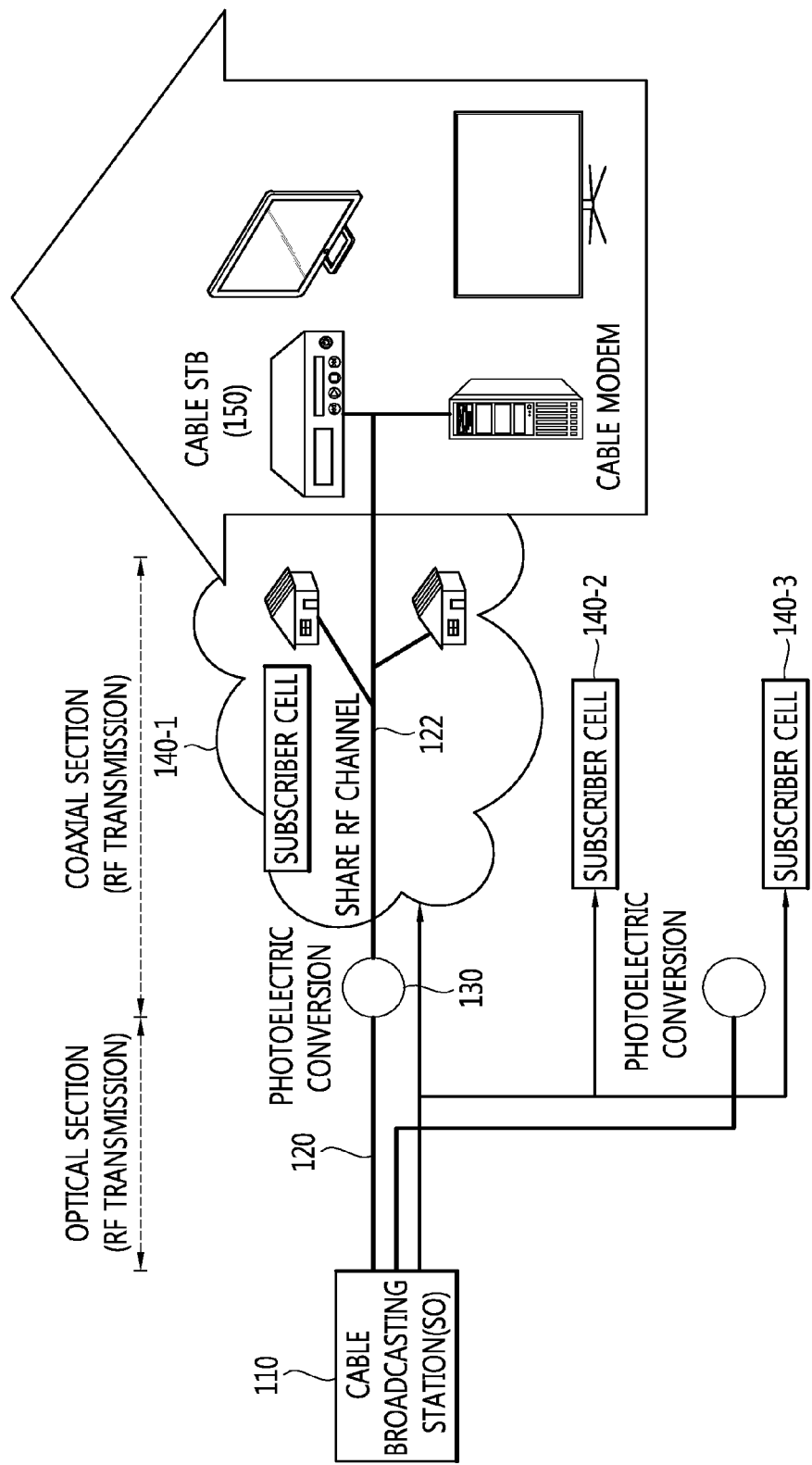
FIG. 1 is a block diagram showing an embodiment of the structure for transferring broadcast service streams in an HFC-based cable network.

The present invention may be modified in various ways and implemented to have several embodiments. Specific embodiments of the present invention are illustrated in the drawings and are described in detail in the detailed description.

It is however to be noted that the present invention is not intended to be limited to the specific embodiments, but is intended to include all modifications, equivalents, or substitutions which fall within the spirit and technical scope of the present invention.

Terms, such as the first and the second, may be used to describe various elements, but the elements should not be limited to the terms. The terms are used to only distinguish one element from the other element. For example, a first element may be named a second element without departing from the scope of the present invention. Likewise, a second element may be named a first element. A term, such as and/or, includes a combination of a plurality of related and described items or any of a plurality of related and described items.

When it is said that one element is 'connected to' or 'coupled with' the other element, it should be understood that one element may be directly connected to or coupled with the other element, but a third element may exist between the two elements. In contrast, when it is said that one element is 'directly connected to' or 'directly coupled with' the other element, it should be understood that a third element does not exist between the two elements.

The terms used in this application are used to only describe the specific embodiments and are not intended to restrict the present invention. An expression of the singular number includes an expression of the plural number unless clearly defined otherwise in the context. In this application, terms, such as 'comprise' and 'have', are intended to designate that characteristics, numbers, steps, operations, elements, or parts which are described in the specification, or a combination of them exist, and should be understood that they exclude the existence or possible addition of one or more other characteristics, numbers, steps, operations, elements, parts, or combinations of them in advance.

All terms used herein, including technical or scientific terms, have the same meanings as those that are typically understood by those skilled in the art, unless otherwise defined. Terms, such as ones defined in common dictionaries, should be constructed as having the same meanings as those in the context of related technology and should not be constructed as having ideal or excessively formal meanings, unless clearly defined in the specification.

Hereinafter, the specific embodiments of the present invention will be described in detail with reference to the accompanying drawings. In describing the present invention, in order to help general understanding, the same reference numerals denote the same elements throughout the drawings and a redundant description of the same elements is omitted.

FIG. 1 is a block diagram showing an embodiment of the structure for transferring broadcast service streams in an HFC-based cable network. As shown in FIG. 1, the broadcast service stream transfer structure may include a System Operator (SO) 110, an optical cable 120, a coaxial cable 122, an Optical Network Unit (ONU) 130, subscriber cells 140-1, 140-2, and 140-3, and a subscriber terminal 150.

Referring to FIG. 1, the SO 110, that is, a multi-channel video service provider, generates broadcast content to be served to a subscriber, transfers the broadcast content to the headend point of the cable network over a service provider supply network, and sends the broadcast content from the headend point to the subscriber terminal 150 over an HFC-based transmission network. The HFC network is connected a point near the subscriber through the optical cable 120, branched through the coaxial cable 122 at the last mile point of a subscriber service group, and then connected to the home of the subscriber. That is, the HFC network includes the optical cable (120) section (hereinafter also called an 'optical section') and the coaxial cable (122) section (hereinafter also called a 'coaxial section'). In this specification, the coaxial section can be used as the same meaning as a cable section.

The headend first performs electrophotic conversion on an up-converted RF signal in order to modulate a broadcast stream, transmitted to the subscriber, into an MPEG-2 TS-based RF signal and send the modulated broadcast stream through the optical section. Next, the ONU 130 located at an optical-coaxial contact point performs photoelectric conversion on the RF signal transmitted through the optical signal again. When the photoelectric conversion is performed on the RF signal, the RF signal is down-converted into a cable frequency band. The down-converted RF signal can be transmitted to the subscriber terminal 150. The subscriber terminal 150 can be provided with service by demodulating the frequency channel of a watched channel and receiving a designed signal using the demodulated channel. In this structure, if the distance radius of the subscriber cells 140-1, 140-2, and 140-3 is great or a branch is complicated, analog transmission devices, such as an amplifier, may be necessary in order to improve the quality of the RF signal.

The ONU 130 at a point where the optical section is terminated performs a passive function for performing photoelectric conversion at a contact point between the optical section and the cable section. The ONU 130 does not perform an active function, such as a function of stopping or exchanging streams. Furthermore, in this transmission structure, broadcast streams, that is, MPEG-2 TS-based streams, are transferred to all the subscriber cells 140-1, 140-2, and 140-3, included in the service group of the headend, in the form of an RF signal, and all content streams are broadcasted to the subscriber through a transmission medium irrespective of whether or not the subscriber watches all the content streams.

As described above, RF-based transmission cannot sufficiently utilize a potential band capacity that can be provided by high-speed optical transmission technology, such as a TDM-PON, in the optical section of an HFC network. This may generate the band bottleneck phenomenon in the cable section.

Figure 2:
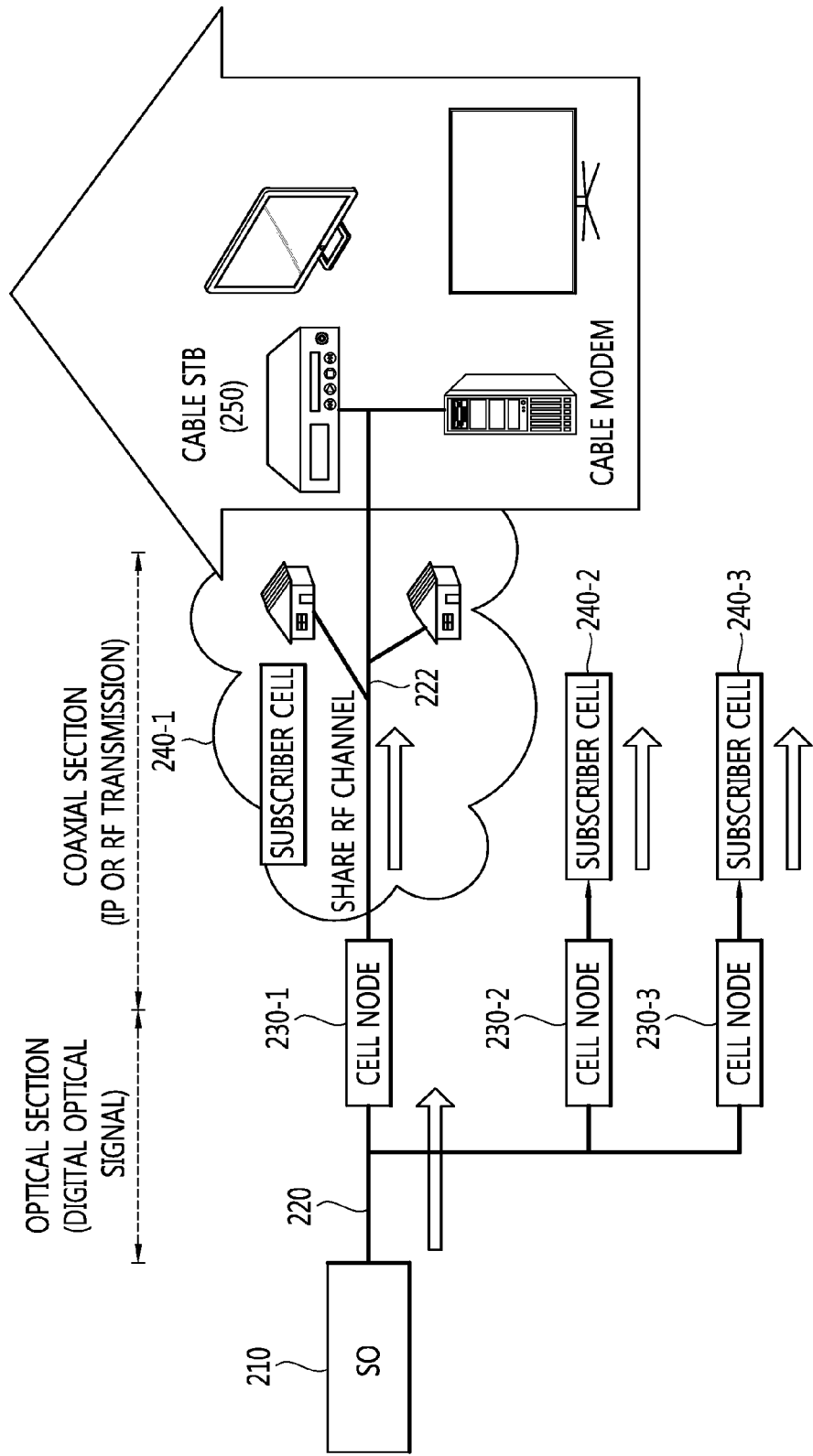
FIG. 2 is a block diagram showing the configuration of a system for transmitting broadcast and data streams in an HFC-based cable network in accordance with an embodiment of the present invention.

FIG. 2 is a block diagram showing the configuration of a system for transmitting broadcast and data streams in an HFC-based cable network in accordance with an embodiment of the present invention. As shown in FIG. 2, the system for transmitting broadcast and data streams in accordance with an embodiment of the present invention may include an SO 210, an optical cable 220, cell nodes 230-1, 230-2, and 230-3, a coaxial cable 222, subscriber cells 240-1, 240-2, and 240-3, and a subscriber terminal 250.

Referring to FIG. 2, broadcast and data streams transmitted by the SO 210 are transmitted through the optical cable 220 in the form of a digital optical signal. The digital optical signal can be converted in specific forms depending on service through the cell nodes 230-1, 230-2, and 230-3 and then transmitted to the subscriber terminal 250 through the coaxial cable 222. First, the broadcast service streams can be transferred in the form of IP-based data in an optical section from the headend of the SO 210 to the cell nodes 230-1, 230-2, and 230-3, that is, the end point of the optical section and also the service entry point of a cable section, using 10 Gbps-grade optical transmission technology. The SO 210 may send the broadcast streams in the form of an RF signal form, if necessary. The cell nodes 230-1, 230-2, and 230-3 can perform RF modulation on the broadcast service streams depending on the service type of the subscriber terminal 250 and send the modulated broadcast service stream in the form of an MPEG-2 TS-based RF signal or an IP-based stream. Furthermore, the cell nodes 230-1, 230-2, and 230-3 may convert the broadcast service streams into RF/IP-converged service streams and send the converted RF/IP-converged service streams. If the broadcast service streams are transmitted as the RF/IP-converged service streams, the subscriber cells 240-1, 240-2, and 240-3 can reuse the same frequency channel band. Accordingly, a frequency band can be easily extended, the signal quality of a short-distance cable section can be improved, and multi-screen service and smart broadcast service can be efficiently provided through the exchange of various types of service streams.

Figure 3:
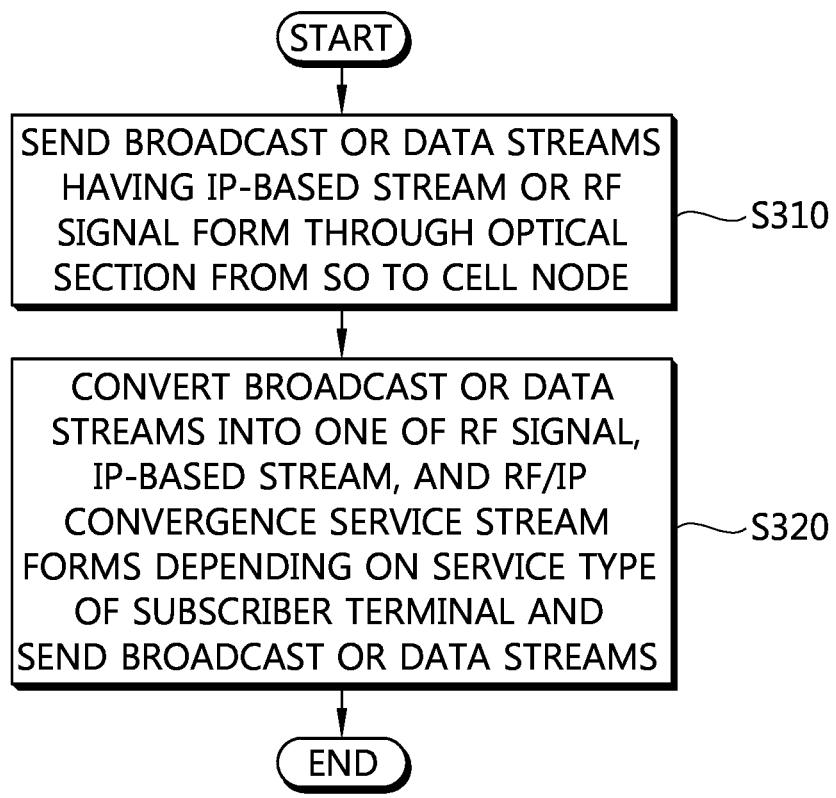
FIG. 3 is a flowchart schematically showing a method for transmitting broadcast and data streams in an HFC-based cable network in accordance with an embodiment of the present invention.

FIG. 3 is a flowchart schematically showing a method for transmitting broadcast and data streams in an HFC-based cable network in accordance with an embodiment of the present invention.

Referring to FIG. 3, first, a broadcast transmission apparatus (it may include an SO) transmits broadcast and data streams in the form of IP-based data or an RF signal over an optical section up to a cell node, that is, a contact point between the optical section of a cable network and a cable section (also called a coaxial section) at step S310. If the broadcast and data streams are transmitted in the form of an RF signal, the broadcast transmission apparatus can provide the broadcast and data streams in the form of an overlay structure through wavelength-division multiplexing so that a plurality of logical networks can be constructed within one physical topology.

The cell node can receive the broadcast and data streams from the broadcast transmission apparatus, convert the received broadcast and data stream into one of an RF signal, an IP-based stream, and an RF/IP convergence service stream depending on the service type of a subscriber terminal, and send the converted RF signal, IP-based streams, or RF/IP convergence service streams to a subscriber terminal through the cable section at step S320. When allocating a frequency band, the cell node can separate the frequency band by the cell, allocate the separated frequency bands over a cable medium, and send the converted streams to terminals belonging to subscriber groups. Here, the cable frequency channel band can be allocated to terminals belonging to subscriber groups that are included in different cells so that the terminals can reuse the same cable frequency channel band.

The cell node can identify a broadcast service request from a subscriber terminal, selectively converts only real-time watching broadcast service streams from among the broadcast and data streams, and send the converted streams to the requesting subscriber terminal. Here, the unit of the subscriber terminal whose broadcast service request is identified can be limited to a subscriber terminal in a cable section, which belongs to a service group using the same cable frequency band.

The cell node can modulate IP-based broadcast and data streams into an MPEG-2 TS-based RF signal and transfer the MPEG-2 TS-based RF signal to the subscriber terminal or can transfer the IP-based broadcast and data transport streams to the subscriber terminal in the cable section irrespective of the protocol of an MAC/PHY transport layer. Furthermore, the broadcast service streams may be subject to photoelectric conversion and transferred to the cable section through in the form of an RF signal. Even in this case, only service streams requested by the subscriber terminal can be filtered and transferred. The cell node can convert a broadcast or Data Over Cable Service Interface Specification (DOCSIS)-based streams having an RF signal form into IP-based broadcast and data transport streams in the cable section irrespective of the protocol of the MAC/PHY transport layer and send the converted broadcast or DOCSIS-based streams to the subscriber terminal.

Figure 4:
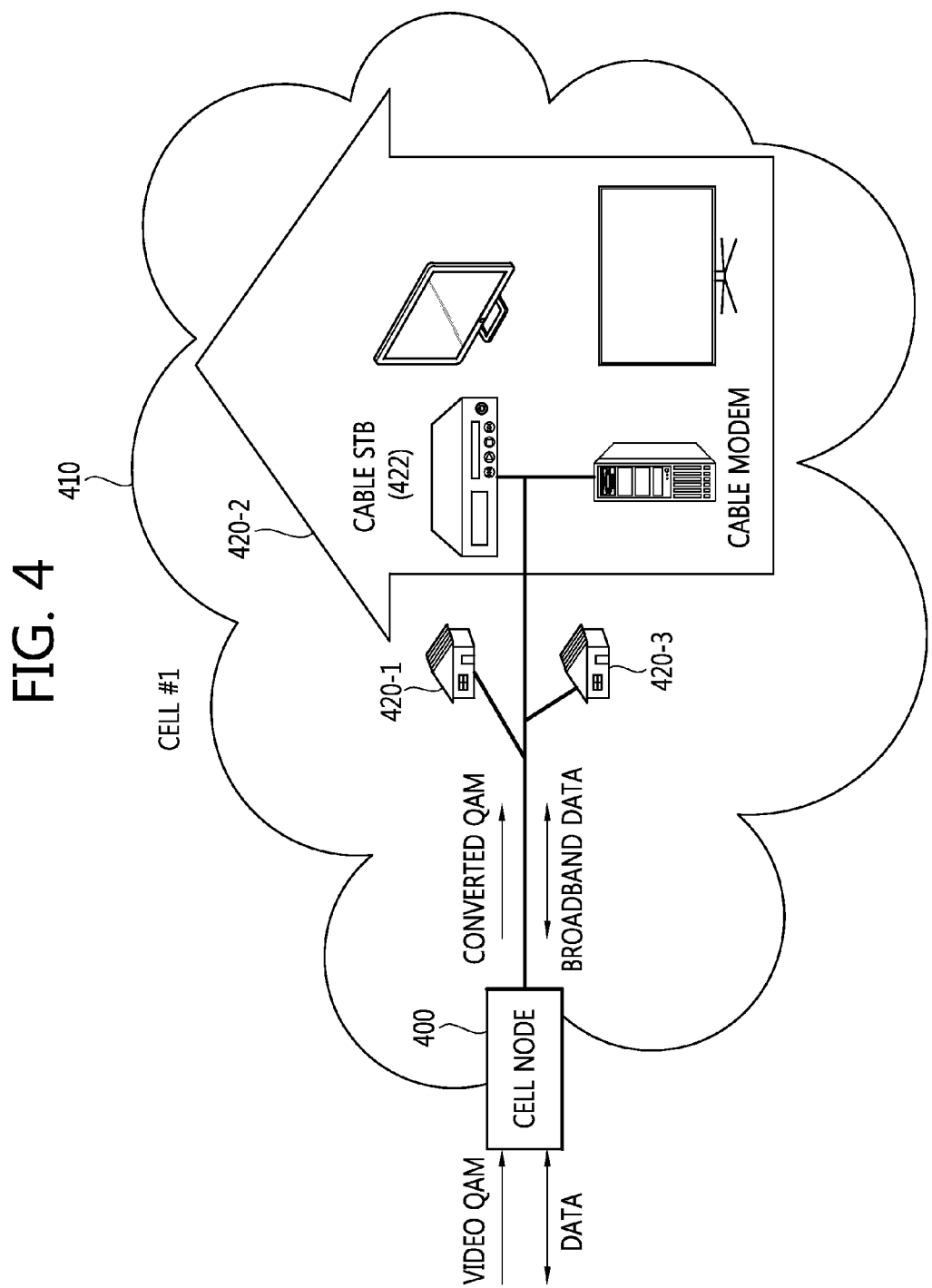
FIG. 4 is a diagram illustrating an operation for transmitting and receiving video streams and broadcast data in the system for transmitting broadcast and data streams in an HFC-based cable network in accordance with an embodiment of the present invention.

FIG. 4 is a diagram illustrating an operation for transmitting and receiving video streams and broadcast data in the system for transmitting broadcast and data streams in an HFC-based cable network in accordance with an embodiment of the present invention.

Referring to FIG. 4, the ONU (refer to FIG. 1) located at the end point of the optical section performs only a passive function for performing photoelectric conversion, whereas a cell node 400 can perform active functions, such as an MAC/PHY function for the termination of a high-speed TDM-PON and high-speed short-distance cable network transmission, a function of the exchange of video service streams, and an IP data switching function with a TS stream, in addition to a photoelectric conversion function. That is, the cell node 400 can be called a smart cable access node.

The cell node 400 can receive video service streams or data from a broadcast transmission apparatus (it may include an SO). Here, the data can be received at the request of the cell node 400. The video service streams and data received by the cell node 400, as described above, can be provided in the form of an overlay structure through wavelength-division multiplexing. The received video service stream and data may be an RF-modulated signal or IP-based streams. The cell node 400 can perform photoelectric conversion on the video service streams or data received in the form of an RF signal and transfer the photoelectric-converted video service streams or data to a cable section or can filter only service streams, requested by the subscriber terminal 422, from the photoelectric-converted video service streams or data and send the service filtered streams to the cable section. Furthermore, the cell node 400 can receive a broadcast service request from a subscriber terminal 422 within each of homes 420-1, 420-2, and 420-3 which is a subscriber included in one cell CELL #1, that is, a service group using the same cable frequency band, irrespective of the type of the broadcast service request and selectively exchange only real-time watching broadcast service streams from among the video service streams or data received through an optical section. Here, the data can be allocated in a broadband and transmitted to the subscriber terminal 422.

Furthermore, the cell node 400 can convert broadcast or DOCSIS-based streams, received in the form of an RF signal through the optical section, into IP-based broadcast and data transport streams in a cable section irrespective of the protocol of an MAC/PHY transport layer and send the IP-based broadcast and data transport streams to the IP-based terminal apparatus (i.e., subscriber terminal) 422 within the home of the subscriber.

Figure 5:
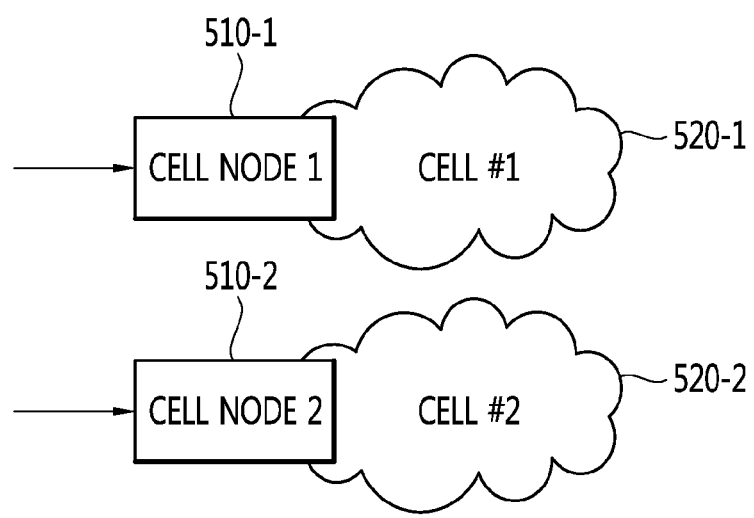
FIG. 5 is a diagram illustrating the reuse of a cable frequency by allocating a frequency channel band by the cell in the system for transmitting broadcast and data streams in an HFC-based cable network in accordance with an embodiment of the present invention.

FIG. 5 is a diagram illustrating the reuse of a cable frequency band by allocating a frequency channel band by the cell in the system for transmitting broadcast and data streams in an HFC-based cable network in accordance with an embodiment of the present invention.

Referring to FIG. 5, the number of cell nodes 510-1 and 510-2 that receive broadcast and data streams from a broadcast transmission apparatus (not shown) through an optical cable may be plural (only the two cell nodes 510-1 and 510-2 are illustrated in the embodiment of FIG. 5, but the present invention is not limited thereto). Accordingly, the cell nodes 510-1 and 510-2 may be deployed to respective cells and a frequency band may be allocated to each cell. Each of the cell nodes 510-1 and 510-2 allocates a frequency channel band to a subscriber terminal included in each cell node. In a prior art, a frequency channel is allocated in the headend and thus service groups belonging to the same headend have the same frequency service structure. In contrast, the frequency service structure of the cable section in accordance with the present invention is limited to a cell, and thus different cells 520-1 and 520-2 can have different frequency service structures and have different structures. For example, the frequency service structure of a subscriber terminal included in the CELL #1 520-1 may be different from the frequency service structure of a subscriber terminal included in the CELL #2 520-2. Accordingly, the CELL #1 520-1 and the CELL #2 520-2 can use the same frequency resources. As a result, an available band of a cable section can be extended because a cable frequency band is reused through cell separation.

Figure 6:
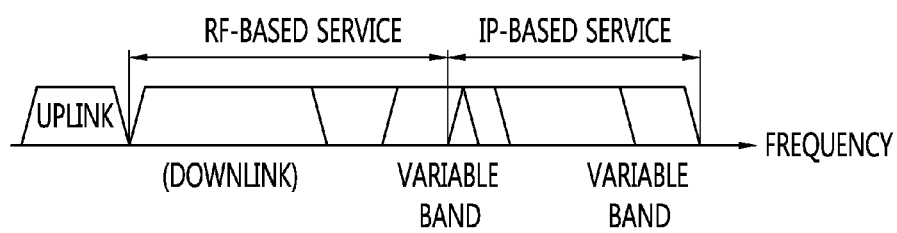
FIG. 6 is a diagram schematically showing uplink and downlink cable frequency bands and frequency bands for RF/IP-based service in the system for transmitting broadcast and data streams in an HFC-based cable network in accordance with an embodiment of the present invention.

FIG. 6 is a diagram schematically showing uplink and downlink cable frequency bands and frequency bands for RF/IP-based service in the system for transmitting broadcast and data streams in an HFC-based cable network in accordance with an embodiment of the present invention.

Referring to FIG. 6, a frequency used in uplink is separated from a frequency used in downlink. Furthermore, in the case of downlink, a frequency allocated to a service stream provided through RB-based service is separated from a frequency allocated to a service stream provided through IP-based service. A cell node can allocate the frequency band to a subscriber terminal included therein depending on the service type of the subscriber terminal with reference to the characteristics of the frequency band. In accordance with the system for transmitting broadcast and data streams in an HFC-based cable network, an available band of a frequency band allocated to a service stream that is provided to a subscriber terminal can be extended because the same frequency band can be used by subscriber groups belonging to different cells through cell separation.

Figure 7:
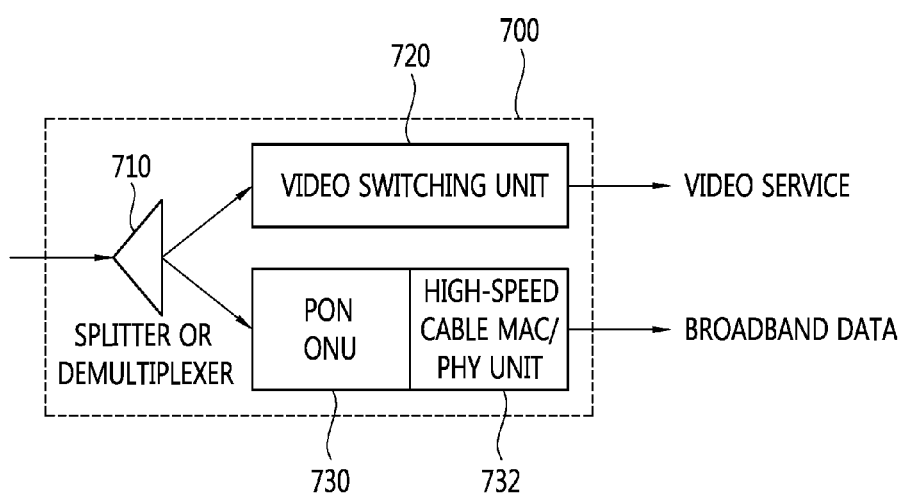
FIG. 7 is a detailed block diagram of a cell node in the system for transmitting broadcast and data streams in an HFC-based cable network in accordance with an embodiment of the present invention.

FIG. 7 is a detailed block diagram of a cell node in the system for transmitting broadcast and data streams in an HFC-based cable network in accordance with an embodiment of the present invention. As shown in FIG. 7, the cell node 700 can include a splitter or a demultiplexer 710, a video switching unit 720, a PON ONU 730, and a high-speed cable MAC/PHY unit 732.

Referring to FIG. 7, the splitter or the demultiplexer 710 splits or demultiplexes received broadcast and data streams into video service streams and data streams. The video streams having an RF signal form or an IP stream form that has been split or demultiplexed by the splitter or the demultiplexer 710 are converted by the video switching unit 720 and then provided to a subscriber terminal (not shown) as video service. The video switching unit 720 can modulate the IP-based broadcast service streams, received through an optical section, into MPEG-2 TS-based RF signals in a cable section and send the MPEG-2 TS-based RF signals to the subscriber terminal. In another embodiment, the video switching unit 720 may perform photoelectric conversion on the video streams having an RF signal form and send the results to the subscriber terminal. Here, only requested service streams can be filtered and transmitted.

The PON ONU 730 performs photoelectric conversion on the IP-based data stream split or demultiplexed by the splitter or the demultiplexer 710. The high-speed cable MAC/PHY unit 732 can send the photoelectric-converted IP-based data service streams to an IP-based terminal apparatus within the home of a subscriber as IP-based data transport streams in the cable section irrespective of the protocol of an MAC/PHY transport layer. Here, the high-speed cable MAC/PHY unit 732 can receive the photoelectric-converted IP-based broadcast service streams from the video switching unit 720, generate IP-based broadcast transport streams through the allocation of a frequency band based on the received IP-based broadcast service streams, and send the generated IP-based broadcast transport streams to the subscriber terminal. As described above, the data transmitted through the high-speed cable MAC/PHY unit 732 can be broadband data.

In accordance with the method and system for transmitting broadcast and data streams in an HFC-based cable network and the method and apparatus for converting broadcast and data streams in an HFC-based cable network according to the present invention, there are advantages in that broadcast frequency bands that must be transmitted at the same time even when they are not used can be efficiently used because only real-time watching broadcast service streams are exchanged and transmitted in each cell, that is, a coaxial section subscriber group, and frequency utilization efficiency and a real use band in a coaxial section can be increased because a frequency band for IP data transmission is variably allocated.

Furthermore, in accordance with the method and system for transmitting broadcast and data streams in an HFC-based cable network and the method and apparatus for converting broadcast and data streams in an HFC-based cable network according to the present invention, there are advantages in that RF or IP transmission in an optical section can be freely performed because the modulation of an RF signal processed in a headend in a prior art is performed in a cell node, that is, the service entry point of a coaxial section, and efficient smart convergence broadcast service can be provided over a cable network by configuring the RF/IP convergence transport platform so that service streams transferred through the optical section can be subject to RF or IP conversion and transmission in each cell node.

Although the present invention has been described with reference to the accompanying drawings and embodiments, it does not mean that the scope of the present invention is limited by the drawings or embodiments and a person having ordinary skill in the art will appreciate that the present invention may modified and changed in various ways without departing from the spirit and scope of the present invention which are written in the following claims.

What is claimed is:

1. A method for transmitting broadcast and data streams in a hybrid fiber coax-based cable network, the method comprising:

a first transmission step of a broadcast transmission apparatus sending broadcast and data service streams in an IP-based stream or radio frequency signal form through an optical section up to a plurality of cell nodes, each cell node associated with a cell comprising a plurality of subscriber terminals as a coaxial section subscriber group and comprising a contact point between the optical section and the coaxial section of a cable network and being the coaxial section entry point; and a second transmission step of any one of the cell nodes comprising:

performing IP modulation of the radio frequency signals and radio frequency modulation of IP-based stream, for the broadcast and data service streams, depending on a service type of a given associated subscriber terminal and sending the converted broadcast and data service streams to the subscriber terminal through the coaxial section; and allocating a cable frequency channel band to the plurality of subscriber terminals in a given associated cell, wherein an identical cable frequency channel band is allocated to two or more cells, each of which being associated with a respective one of the plurality of the cell nodes, wherein the second transmission step comprises a step of identifying a broadcast service request from the subscriber terminal, selecting only real-watching broadcast service streams corresponding to the request, and converting only the selected broadcast service streams.

2. The method of claim 1, wherein the first transmission step comprises a step of providing the broadcast service streams having the radio frequency signal form in an overlay structure form through wavelength-division multiplexing so that a plurality of independent logical networks is constructed in one physical topology.

3. The method of claim 1, wherein the second transmission step comprises a step of separating frequency channel bands through a cable medium for each cell, allocating the separated frequency channel band to each cell, and sending the converted transport streams to terminals belonging to a subscriber group within the cell.

4. The method of claim 1, wherein the second transmission step comprises:
identifying a broadcast service request from the subscriber terminal within the coaxial section which belongs to a service group using an identical frequency band,
selecting only real-time watching broadcast service streams from the broadcast and data service streams, and
converting the selected real-time watching broadcast service streams.

5. The method of claim 1, wherein the second transmission step comprises a step of modulating the IP-based broadcast and data service streams into MPEG-2 TS-based radio frequency signals and sending the MPEG-2 TS-based radio frequency signals to the subscriber terminal or generating IP-based broadcast and data transport streams in the coaxial section irrespective of a protocol of an MAC/PHY transport layer based on the IP-based broadcast and data service streams and sending the IP-based broadcast and data transport streams to the subscriber terminal.

6. The method of claim 1, wherein the second transmission step comprises a step of performing photoelectric conversion on the broadcast service streams having the radio frequency signal form and sending the photoelectric-converted broadcast service streams through the coaxial section or filtering only service streams, requested by the subscriber terminal, from the broadcast service streams having the radio frequency signal form and sending the filtered service streams to the subscriber terminal.

7. The method of claim 1, wherein the second transmission step comprises a step of generating IP-based broadcast and data transport streams in the coaxial section irrespective of a protocol of an MAC/PHY transport layer based on broadcast or data over cable service interface specification-based service streams having the radio frequency signal form and sending the IP-based broadcast and data transport streams to the subscriber terminal.

8. A system for providing broadcast service in a hybrid fiber coax-based cable network, the system comprising:
a broadcast transmission apparatus configured to send broadcast and data service streams in an IP-based stream or radio frequency signal form through an optical section up to a plurality of cell nodes, each cell node associated with a cell comprising a plurality of subscriber terminals as a coaxial section subscriber group and comprising a contact point between the optical section and a coaxial section of a cable network and being the coaxial section entry point;
each cell node configured to perform IP modulation of the radio frequency signals and radio frequency modulation of IP-based stream, for the broadcast and data service streams depending on a service type of a given associated subscriber terminal, to allocate a cable frequency channel band to the plurality of subscriber terminals in a given associated cell, wherein an identical cable frequency channel band is allocated to two or more cells, each of which being associated with a respective one of the plurality of the cell nodes, and to send the converted broadcast and data service streams to the given associated subscriber terminal through the coaxial section; and
the subscriber terminal configured to receive the converted streams from the cell node,
wherein the cell node identifies a broadcast service request from the subscriber terminal, selects only real-watching broadcast service streams corresponding to the request, and converts only the selected broadcast service streams.

9. The system of claim 8, wherein the broadcast transmission apparatus provides the broadcast service streams having the radio frequency signal form in an overlay structure form through wavelength-division multiplexing so that a plurality of independent logical networks is constructed in one physical topology.

10. The system of claim 8, wherein the cell node separates frequency channel bands through a cable medium for each cell, allocates the separated frequency channel band to each cell, and sends the converted transport streams to terminals belonging to a subscriber group within the cell.

11. The system of claim 8, wherein the cell node identifies a broadcast service request from the subscriber terminal within the coaxial section which belongs to a service group using an identical cable frequency band, selects only real-time watching broadcast service streams from the broadcast and data service streams, and converts the selected real-time watching broadcast service streams.

12. The system of claim 8, wherein the cell node modulates the IP-based broadcast and data service streams into MPEG-2 TS-based radio frequency signals and sends the MPEG-2 TS-based radio frequency signals to the subscriber terminal or generates IP-based broadcast and data transport streams in the coaxial section irrespective of a protocol of an MAC/PHY transport layer based on the IP-based broadcast and data service streams and sends the IP-based broadcast and data transport streams to the subscriber terminal.

13. The system of claim 8, wherein the cell node performs photoelectric conversion on the broadcast service streams having the radio frequency signal form and sends the photoelectric-converted broadcast service streams through the coaxial section or filters only service streams, requested by the subscriber terminal, from the broadcast service streams having the radio frequency signal form and sends the filtered service streams to the subscriber terminal.

14. The system of claim 8, wherein the cell node generates IP-based broadcast and data transport streams in the coaxial section irrespective of a protocol of an MAC/PHY transport layer based on broadcast or data over cable service interface specification-based service streams having the radio frequency signal form and sends the IP-based broadcast and data transport streams to the subscriber terminal.

15. A broadcast and data stream conversion method of a cell node located at a contact point between an optical section and a coaxial section in a hybrid fiber coax-based cable network, the method comprising:

receiving broadcast and data service streams having an IP-based stream or radio frequency signal form from a broadcast transmission apparatus; and performing IP modulation of the radio frequency signals and radio frequency modulation of IP-based stream, for the broadcast and data service streams depending on a service type of a subscriber terminal and sending the converted broadcast and data service streams to the subscriber terminal through the coaxial section;

wherein the cell node allocates a cable frequency channel band to the plurality of subscriber terminals in a given associated cell wherein an identical cable frequency channel band is allocated to two or more cells, each of which being associated with a respective one of the plurality of the cell nodes, and wherein the cell node identifies a broadcast service request from the subscriber terminal, selects only real-watching broadcast service streams corresponding to the request, and converts only the selected broadcast service streams.

16. A broadcast and data stream conversion apparatus of a cell node located at a contact point between an optical section and a coaxial section in a hybrid fiber coax-based cable network, the apparatus comprising:

a reception unit configured to receive broadcast and data service streams having an IP-based stream or radio frequency signal form from a broadcast transmission apparatus; and a transmission unit configured to perform IP modulation of the radio frequency signals and radio frequency modulation of IP-based stream, for the broadcast and data service streams, depending on a service type of a subscriber terminal and sending the converted broadcast and data service streams to the subscriber terminal through the coaxial section, wherein the transmission unit allocates a cable frequency channel band to the plurality of subscriber terminals in a given associated cell, wherein an identical cable frequency channel band is allocated to two or more cells, each of which being associated with a respective one of the plurality of the cell nodes, and wherein the transmission unit identifies a broadcast service request from the subscriber terminal, selects only real-watching broadcast service streams corresponding to the request, and converts only the selected broadcast service stream.

* * * * *